United States Patent Office 3,130,305
Patented Apr. 21, 1964

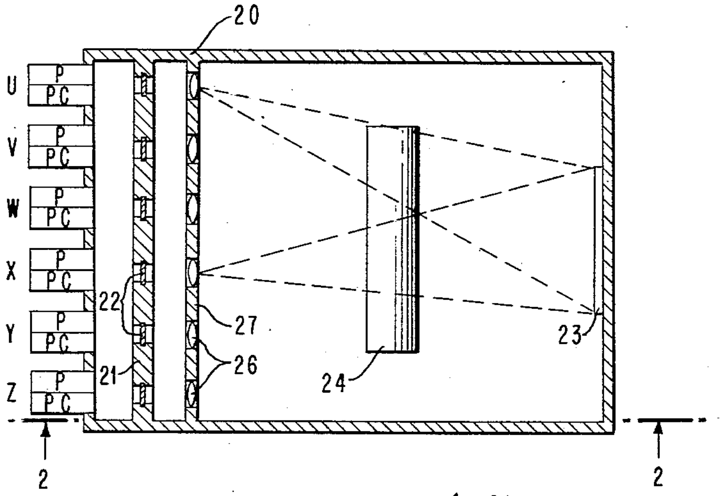
FIG. 1
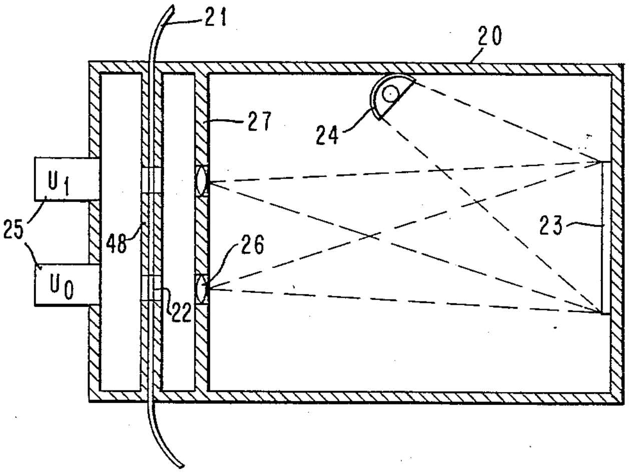
FIG. 2
FIG. 3
| | ITEM | | | LOCATION | | |
|---|---|---|---|---|---|---|
| 0 | 0 | 0 | 0 | 1 | 0 | 0 |
| 1 | 0 | 0 | 1 | 0 | 0 | 0 |
| 2 | 0 | 1 | 0 | 1 | 0 | 1 |
| 3 | 0 | 1 | 1 | 0 | 1 | 0 |
| 4 | 1 | 0 | 0 | 1 | 1 | 1 |
| 5 | 1 | 0 | 1 | 0 | 0 | 1 |
| 6 | 1 | 1 | 0 | 0 | 1 | 1 |
| 7 | 1 | 1 | 1 | 1 | 1 | 0 |
| | U | V | W | X | Y | Z |
22 or 23
| | |
|---|---|
| 0 | 1 |
| 2 | 3 |
| 4 | 5 |
| 6 | 7 |
FIG. 4
FIG. 6
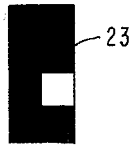
FIG. 7
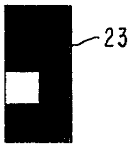
INVENTOR
IVAN E. SUTHERLAND
BY Robert W. Burray
ATTORNEY FIG. 10
| | BCD | | | | | | | | | BINARY | | | |
|---|---|---|---|---|---|---|---|---|---|---|---|---|---|
| 0 | 0 | 0 | 0 | 0 | 0 | | | | | 0 | 0 | 0 | 0 |
| 1 | 0 | 0 | 0 | 0 | 1 | | | | | 0 | 0 | 0 | 1 |
| 2 | 0 | 0 | 0 | 1 | 0 | | | | | 0 | 0 | 1 | 0 |
| 3 | 0 | 0 | 0 | 1 | 1 | | | | | 0 | 0 | 1 | 1 |
| 4 | 0 | 0 | 1 | 0 | 0 | | | | | 0 | 1 | 0 | 0 |
| 5 | 0 | 0 | 1 | 0 | 1 | | | | | 0 | 1 | 0 | 1 |
| 6 | 0 | 0 | 1 | 1 | 0 | | | | | 0 | 1 | 1 | 0 |
| 7 | 0 | 0 | 1 | 1 | 1 | | | | | 0 | 1 | 1 | 1 |
| 8 | 0 | 1 | 0 | 0 | 0 | | | | | 1 | 0 | 0 | 0 |
| 9 | 0 | 1 | 0 | 0 | 1 | | | | | 1 | 0 | 0 | 1 |
| 10 | 1 | 0 | 0 | 0 | 0 | | | | | 1 | 0 | 1 | 0 |
| 11 | 1 | 0 | 0 | 0 | 1 | | | | | 1 | 0 | 1 | 1 |
| | A | B | C | D | E | | | | | W | X | Y | Z |
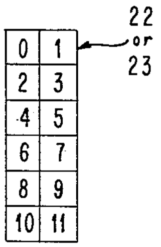
FIG. 11
FIG. 12
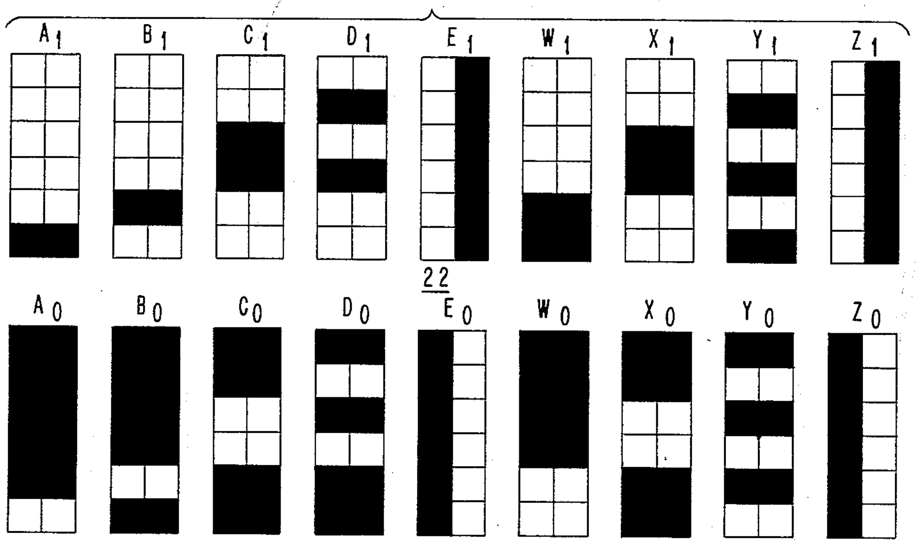
FIG. 13
FIG. 14

3,130,305
OPTICAL SYSTEM FOR RETRIEVING STORED INFORMATION

Ivan E. Sutherland, Cambridge, Mass., assignor to International Business Machines Corporation, New York, N.Y., a corporation of New York
Filed Dec. 22, 1960, Ser. No. 77,582
4 Claims. (Cl. 250—71)

This invention relates to information retrieval systems and more particularly to such systems especially suitable for relatively permanent storage of, and easy access to large quantities of information.

Data processing often requires the relatively permanent storage of large quantities of information. Data processing also requires in some instances means for translating items of information in a first code to another code form. Large capacity storage has been provided by many devices including magnetic tapes, magnetic drums, and disks. The amount of information that can be stored in these devices is great, but access to this information is a relatively slow process when a particular item of information is desired.

In order to provide rapid access to large quantities of information, devices such as beam storage systems utilizing cathode ray tubes for addressing particular items of information stored on films have been developed. Such a device is described in Patent 2,830,285, Storage System, Davis et al. Needless to say, positioning of an electron beam to one discrete spot out of several thousand on the cathode ray tube, for addressing particular items of information, requires a great deal of electronic circuitry as shown in the above-cited reference.

Although the above-mentioned devices provide storage for great quantities of information, they are not suitable for storage devices recently being developed and classified as associative memories or tag memories. Random access to information items is possible but not too efficient in all of the above systems and in three dimensional bistable memory devices. This access is confined primarily to a particular address, often unrelated to the information item stored therein. The term "information item" being used herein refers to a plurality of binary digits which make up a binary word. Certain of the binary digits within the word may define one feature of the item and other digits of the word may define another feature of the item. A simple example of this would be a plurality of binary digits which would define a manufacturing part number, a drawing number, a location of the item in a warehouse, and other pertinent information. Each of the information items in the storage system, therefore, may be unique from each of the other items in several particulars. The associative memory operation would provide that a particular information item may be obtained by addressing that item by its part number, or its drawing number, or its location. If a drawing number is known of a particular item, the entire information of this item may be obtained by addressing the item by its drawing number. This type of operation is impossible in the devices described above as in these devices a particular item of information has a particular location and this location must be known in order to obtain all the information about the item.

Those skilled in the art will recognize that the systems described above, primarily storage systems, would not be classified as code translators. Translation from one code system to another code system requires a fairly unique device for the translation desired. Translation from straight binary notation to binary coded decimal requires one system. If it were desired to translate from binary coded decimal to straight binary, another translation system would be required.

It is a general object of this invention to provide an improved storage system.

It is another object of this invention to provide a simple and inexpensive device capable of a storage mode of operation and a translator mode of operation.

It is another object of this invention to provide a storage device capable of an associate type of access.

It is a further object of this invention to provide a storage device and/or translator wherein access to complete information items is accomplished by use of the information storage medium.

These and other objects of the invention are attained in accordance with features of the invention by the combination of a plurality of members having information data stored thereon in the form of a plurality of discrete opaque and nonopaque areas. A lens system focuses the image of each of the storage members upon a phosphorescent screen at the same location. Transmission of radiations to the screen through nonopaque areas of some of the storage member quenches normal luminescence of the screen at corresponding discrete areas producing a spot of light on the screen defining an item of information. Read-out means are provided adjacent to the radiation projectors for generating electrical signals in accordance with the passage of light from the light spot on the screen back through the lens system and nonopaque areas of all the storage members.

The foregoing and other objects, features and advantages of the invention will be apparent from the following more particular description of the preferred embodiments of the invention, as illustrated in the accompanying drawings.

In the drawings:

FIGS. 1 and 2 show a plan and elevation view respectively of an apparatus for practicing the invention.

FIG. 3 is a table showing several items of information having a plurality of binary digits.

FIG. 4 shows a manner in which a light forming screen is divided into discrete areas corresponding to items of information.

FIGS. 6 and 7 depict a light forming screen after a particular item of information has been addressed.

FIG. 10 is a table of binary numbers and corresponding binary coded decimal numbers.

FIG. 11 shows a light producing screen with discrete areas corresponding to a particular number.

FIG. 12 shows the manner of coding a plurality of translucent members with opaque and nonopaque areas in a code translation mode of operation of the invention.

FIGS. 13 and 14 depict a light forming screen with a light spot produced in accordance with input information.

FIGS. 1 and 2 show at least one arrangement of components for practicing the invention. A description of all components will first be given followed by examples for practicing the invention.

*General Arrangement*

Figure 5:
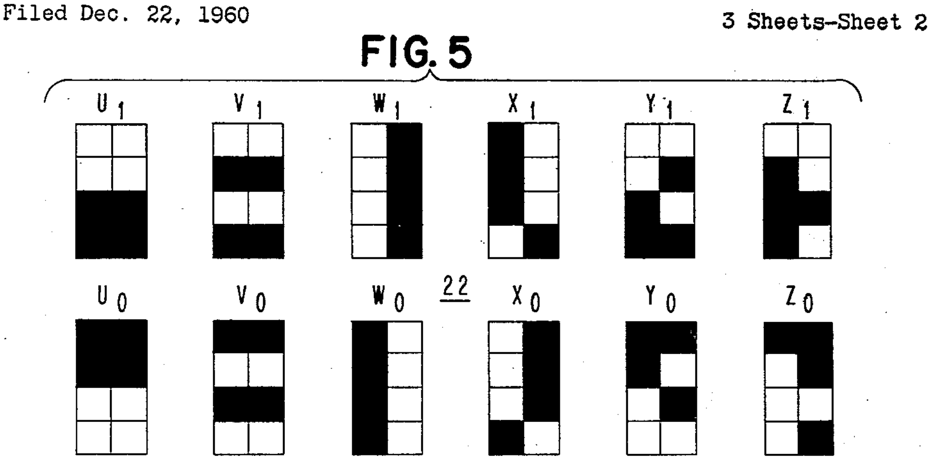
FIG. 5 shows a plurality of translucent information storage members having a plurality of opaque and nonopaque discrete areas corresponding to binary information items.

A light-tight box 20 houses the components. Mounted within the box by suitable means 21 are a plurality of translucent storage members in the form of photographic slides 22 coded with information in the form of opaque and nonopaque areas. Mounted on an inner wall of the box 20 is a light producing member in the form of a phosphorescent screen 23. The screen 23 is flooded with ultraviolet light from a source 24. Suitable means 25 are provided for housing a plurality of projectors (P) for emitting infrared radiations. Also mounted within the housings 25 are a plurality of photocell devices (PC). A series of lenses 26 are mounted by suitable means 27 between a corresponding translucent member 22 and the screen 23. The lenses 26 are effective to focus the image of all translucent members 22 upon the screen 23 at the same location.

*Light Producing Member*

The light producing member, or screen 23, has certain properties. When the screen 23 is flooded with ultraviolet light such as from source 24, the screen will produce a luminescence. The luminescence of the screen can be selectively extinguished or quenched by simultaneously exciting the screen with infrared radiations. Such a screen may be purchased from the C. P. Goerz American Optical Company. This company has used such a screen for viewing photographic negatives as positives. Resolution of such a screen is in the order of 580,000 bits per square inch. It is quite practical in using the concepts of this invention to provide storage of 1,000,000 items of information, each item having 80 binary digits.

*Translucent Storage Members*

A pair of translucent storage members 22, in the form of photographic film, are provided for each of the two possible binary notations of each of the digits of a complete binary item of information. In other words, as shown in a following simplified example, six pairs of storage members must be provided for the storage of information items containing six binary digits.

Each of the translucent storage members 22 is divided into discrete areas corresponding to particular items of information. As shown in the following simplified example, each of the translucent storage members 22 has been divided into eight discrete areas to represent eight items of information. The arrangement of the discrete areas is not important, but the same discrete area on all storage members must correspond to the same item of information.

Each discrete area of each of the translucent storage members 22 is made opaque or nonopaque in accordance with the binary value of the digit the translucent member represents for the particular item of information. A "1's" translucent storage member and a "0's" translucent storage member is provided for each digit of the information item. If a particular digit of a particular item of information is a "1," the "1's" translucent member will be made opaque in the corresponding discrete area, and the "0's" translucent member will be made nonopaque for the corresponding discrete area.

*Associative Memory*

FIGS. 3–7 provide a means for describing the operation of the invention in an associative memory type of operation. FIG. 3 shows a table of eight information items containing six binary digits U–Z. A part number is identified by three binary digits U–W and the location of a particular item is identified by three binary digits X–Z.

As mentioned previously, each item of information will be represented by a discrete area on both the translucent storage members 22 and the screen 23. The arrangement of the discrete areas is shown in FIG. 4, but is by no means the only arrangement that can be made.

FIG. 5 shows the manner of coding the translucent storage members 22 in accordance with the information items shown in FIG. 3. The translucent members 22 will be identified by the digit position and whether it is a "1's" or a "0's" member (e.g. U1 or U0).

Taking translucent member U1 as an example, it can be seen that digit U is a binary 0 for items 0–3, and is a binary 1 for items 4–7. As previously mentioned, translucent storage member U1 will be coded such that discrete areas 0–3 corresponding to "0's" for items 0–3 will be nonopaque and discrete 4–7, corresponding to "1's" for items 4–7 will be opaque.

The U0 translucent storage member will be opaque in discrete areas 0–3 as the binary value of digit U is "0" for items 0–3. Discrete areas 4–7 of member U0 will be nonopaque as the binary value of digit U of items 4–7 is "1." It can be seen that members U1 and U0 are exact complements of each other indicating that the negative of one will produce the other. The remaining digits V–Z of each information item may be produced in a like manner producing opaque and nonopaque discrete areas as shown in FIG. 5.

Figures 8, 9:
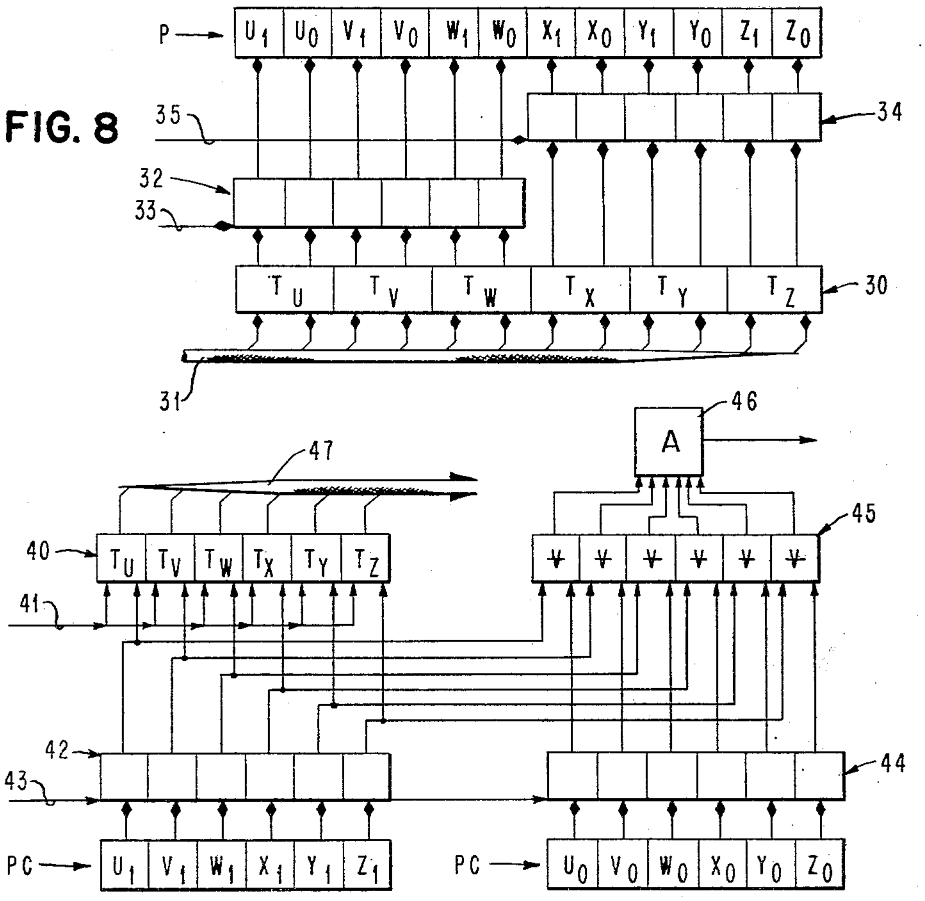
FIG. 8 shows schematically electronic means for energizing radiation projectors for addressing a particular item of information.
FIG. 9 is a schematic representation of electronic output means responsive to light responsive means for reading out an entire item of information.

FIG. 8 shows the manner in which a particular item of information is addressed. The information known of a particular item is inserted in binary notation into some of a group of triggers 30 corresponding to a particular digit of the information items. The address information is entered by way of cable 31 to the "1" or "0" input of each of the triggers. If the item of information is known, a unique combination of "1's" or "0's" would be inserted into triggers U–W. The triggers would therefore be set to one of two stable states indicating the known information. This information will be applied to the projectors P by way of a series of gates 32 by applying an input pulse on line 33. One projector P of each of the binary digits known will be energized to transmit infrared radiations through the corresponding translucent storage member 22 to the screen 23.

If the location of a particular item were known, address information would have been inserted into triggers X–Z and readout through a series of gates 34 by a sampling from line 35.

FIG. 8 represents one mode of utilizing the present invention for the particular problem shown. The projectors P need only be energized by any suitable means which will uniquely define an item of information.

As an example, assume that all information concerning item 5 is desired. This being the case, projectors P associated with digits U–W will be energized by the means of FIG. 8 such that infrared radiations will be projected through translucent members U1, V0, and W1.

FIG. 6 shows a representation of the screen 23 after energization of the above-mentioned projectors. As mentioned previously, the luminescence produced on screen 23 by flooding from the ultraviolet source 24 will be quenched or extinguished wherever infrared radiations also excite the screen. Infrared radiations transmitted through nonopaque areas of translucent storage member U1 will quench the luminescence of screen 23 in discrete areas 0–3. Infrared radiations transmitted through translucent member V0 will in addition quench luminescence from screen 23 at discrete areas 6 and 7. Infrared radiations transmitted through translucent storage member W1 will in addition quench luminescence of screen 23 at discrete area 4. As a result, all areas of the screen 23 have been darkened leaving a spot of light formed corresponding to discrete area 5, the discrete area associated with item 5.

FIG. 9 shows output means responsive to light transmitted from a discrete area of screen 23 back through the translucent storage members 22 to photocells PC. The output information is inserted into a series of triggers 40 corresponding to digits U–Z. The triggers 40 are first set to represent a binary "1" by a pulse on line 41. Only those photocells PC associated with the "1's" translucent storage member 22 are utilized to enter the output information into triggers 40. The energization of the photocells PC is sampled at a series of gates 42 by a sample pulse on line 43. Any particular "1's" photocell PC which is energized will apply through gates 42 a pulse to the "0" side of an associated trigger. Thus if photocell U1 has been energized, the trigger associated with digit U will be switched to the opposite stable state to represent a binary "0." The voltage state of the "1" side of each of the triggers 40 is applied by way of a cable 47 to any suitable output device.

An error condition may be recognized whenever more than one discrete area of the screen 23 has been left with luminescence. If the address information has not been entered properly or a particular infrared projector P has not been energized, more than one discrete area of screen 23 will be left with luminescence. This condition can be recognized as an error condition in that at least one digit position will have both the "1" and "0" photocells PC energized. The outputs of the "1's" photocell and the "0's" photocell for each digit position are sampled by a pulse on line 43 applied to gates 42 and another series of gates 44 conditioned by the "0's" photocells. A series of exclusive OR circuits 45 will indicate the error condition through an AND circuit 46 whenever more than one photocell or no photocell has been energized for a particular digit position. An output will be produced from AND circuit 46 when there has been no error produced. This output of AND circuit 46 may be utilized to effect a read-out of the information in triggers 40.

In the illustrative example given previously wherein it was desired to obtain all information concerning item 5, the light spot formed at the discrete area 5 will be read back through the lens system 22 to photocells PC which receive the light through nonopaque discrete area 5 of an associated translucent storage member. In the example given, discrete area 5 of screen 23 will be transmitted back through area 5 of translucent storage members U0, V1, W0, X1, Y1, and Z0. A comparison of this output (010110) with the digital information shown in FIG. 3 for item 5 shows that the photocells PC are energized in a combination which is the complement of the desired information. As mentioned previously in connection with FIG. 9, only the "1's" photocells are utilized to change the stable state of triggers 40 from "1" to "0." In this manner, a complementing of the output information is achieved to obtain the desired information.

It should be understood at this time that additional binary information, not necessarily unique for each information item, may be stored and obtained by merely providing additional pairs of translucent members, lenses, and photocells for each digit of additional information. It is also apparent that a person skilled in the art could provide means whereby only unknown information would be read out. Projectors are lighted with known information so this data could be inserted immediately in an output device and only require transfer of information from photocells associated with storage members having no projectors energized.

Assume that another problem concerning the above arrangement is to determine all information concerning the item in location 7. In this particular problem, input information would be inserted in triggers X–Z in FIG. 8. This information would be in the form of all "1's" for these three digits. A sampling of the triggers X–Z through gates 34 by sample pulse 35 will energize the infrared projectors associated with translucent storage members X1, Y1, and Z1.

FIG. 7 shows the discrete area of screen 23 which will be left with luminescence after this addressing operation. Infrared radiations transmitted through translucent storage member X1 will extinguish discrete areas 1, 3, 5, and 6. Radiations transmitted through translucent storage member Y1 will in addition extinguish discrete areas 0 and 2. Infrared radiations transmitted through translucent storage member Z1 will finally extinguish discrete area 7. The only discrete area of screen 23 left with luminescence is that corresponding to information item 4. Discrete area 4 which is left with luminescence will energize the photocells PC associated with translucent storage members U0, V1, W1, X0, Y0 and Z0. This reading (011000) will be complemented through the action of the circuitry in FIG. 9 to produce the complemented output 100111 which indicates that the item stored in location 7 is item 4.

*Translator Mode of Operation*

FIGS. 10–14 show the manner in which the present invention can be utilized for performing code translation. FIG. 10 shows a table of binary coded decimal numbers having digits A–E and corresponding numbers in straight binary notation represented by digits W–Z. FIG. 11 shows an arrangement of discrete areas corresponding to particular numbers arranged as they will appear on the screen 23 and as they will be coded on the translucent storage members 22. FIG. 12 shows nine pairs of translucent storage members 22 and the way they would appear after coding with opaque and nonopaque areas in accordance with the procedures set forth above in connection with the associative memory operation.

FIG. 13 shows the light spot on screen 23 which would remain after addressing the infrared projectors P to convert the number 10 in binary coded decimal notation to straight binary notation. Energization of the infrared projectors behind translucent storage members A1, B0, C0, D0, and E0 will extinguish all areas of the screen 23 with the exception of discrete area 10. The light produced by discrete area 10 would be read by photocells PC associated with translucent storage members W0, X1, Y0, and Z1. A complementing of this information in circuitry similar to that shown in FIG. 9 would produce the desired output information of 1010 the straight binary code for the numeral 10.

In a like manner, a translation can be accomplished with the same arrangement shown in FIGS. 10–14 from straight binary to binary coded decimal. FIG. 14 shows the discrete area of screen 23 left with luminescence after addressing digit positions W–Z. Infrared projectors P, for translating the numeral 11, would be energized to transmit infrared radiations through translucent storage members W1, W0, Y1, and Z1. After quenching, screen 23 would produce luminescence only from discrete area 11 which would be read by photocells PC associated with translucent storage members A0, B1, C1, D1, and E0. This information (01110) would be complemented in circuitry similar to that of FIG. 9 to produce the desired binary coded decimal output of 10001.

The structure shown in FIGS. 1 and 2 can be utilized in one instance as an associative memory, and in another instance as a translator. Pairs of projectors, photocells, storage members, and lenses may be arranged in any suitable manner, the number equal to the maximum number of binary digits which will be utilized. The only concern being that the lens system be able to project the image of corresponding discrete areas of each storage member to the same location on the screen 23. The shape of the screen and/or translucent storage members is not important, but it is important that the corresponding discrete area on each of the storage members is associated with a particular item of information. If it is desired to have only a particular one-way translation, it would be necessary to provide only projectors for the original code and only photocells for the translated code.

FIG. 2 indicates that the support 21 for the translucent storage members 22 could be a positionable member held by suitable means 48 within the box 20. Any suitable arrangement, not shown, may be provided for retaining a supply of the support 21 with a plurality of sets of translucent storage members 22. In this manner, with one particular set of storage members inserted in the mechanism, the device can be caused to operate as an associative memory in a cataloging operation as previously described, and then a new operation can be performed, such as a translation previously described, by positioning a new set of storage members in position. Several sets of storage members can provide several types of information storage and likewise, several sets of translucent members can provide several translation problems choosen at the will of an operator.

There has thus been described a very simple and inexpensive means for performing a storage operation or translation operation with one device. The function is not complicated by an expensive and complicated addressing scheme as the information storage members themselves are utilized for the addressing and read-out of desired information. Electronic components have been reduced to a minimum retaining a relatively large storage capacity in a relatively compact area.

While the invention has been particularly shown and described with reference to preferred embodiments thereof, it will be understood by those skilled in the art that the foregoing and other changes in form and details may be made therein without departing from the spirit and scope of the invention.

I claim:

1. A device of the class described comprising:
a plurality of translucent members having information data stored thereon in the form of a plurality of discrete opaque and nonopaque areas;
a light producing member;
means including at least some of said translucent members for forming a light spot on said light producing member corresponding to one of said discrete areas;
means for directing light from said spot through a corresponding area on others of said translucent members; an output means; and means operating in response to light transmitted from said spot through said translucent members for applying information data to said output means.

2. A device of the class described comprising:
a plurality of translucent members having information data stored thereon in the form of a plurality of discrete opaque and nonopaque areas;
a phosphorescent screen having properties of luminescence when excited by ultraviolet radiations and the quenching of said luminescence when simultaneously excited with infrared radiations;
a source of ultraviolet radiations for exciting said screen;
means for transmitting infrared radiations through nonopaque areas of some of said translucent members for quenching all luminescence from said screen except a light spot corresponding to one of said discrete areas;
means for directing light from said spot through a corresponding area on others of said translucent members; an output means; and means operating in response to the transmission of light through said other translucent members for applying information data to said output means.

3. A device of the class described comprising:
a plurality of pairs of translucent members having information data stored thereon in the form of a plurality of discrete opaque and nonopaque areas, one pair of said members for each digit of an information item, each of said discrete areas of each of said members defining the binary value of the corresponding digit of a particular item of information, the corresponding discrete area on all said members defining a complete item of binary information;
a phosphorescent screen capable of luminescence when excited by ultraviolet radiations, said luminescence being quenched when said screen is simultaneously excited by infrared radiations;
a source of ultraviolet radiations for exciting said screen;
a lens system focusing the image of all said storage members on said screen at the same location;
a plurality of pairs of infrared projectors, each of said projectors transmitting radiations to said screen through nonopaque areas of a corresponding storage member;
means for energizing one projector in each of some of said pairs to define a particular item of information whereby the luminescence of said screen is quenched with the exception of a discrete area corresponding to the particular item of information;
output means;
and a plurality of photocells, one for each of said storage members, for applying electrical signals to said output means dependent on passage of light back through said lens system from said screen and through the nonopaque discrete areas of said storage members corresponding to the particular item of information.

4. The device of claim 2 in which said translucent members are arranged in pairs, the opaque and nonopaque areas of one member in each pair being the complement of the areas in the other member, and each pair of members representing one digit of information data with one member representing a binary "1" while the other represents a binary "0" of said digit.

References Cited in the file of this patent

UNITED STATES PATENTS

| | | |
|---|---|---|
| 2,016,036 | Fitz Gerald | Oct. 1, 1935 |
| 2,482,242 | Brustman | Sept. 20, 1949 |
| 2,733,631 | McLachlan | Feb. 7, 1956 |
| 2,742,631 | Rajchman et al. | Apr. 17, 1956 |
| 2,802,947 | Hamacher | Aug. 13, 1957 |
| 2,855,539 | Hoover | Oct. 7, 1958 |
| 2,922,987 | Haugk | Jan. 26, 1960 |
| 2,996,617 | Heckscher | Aug. 15, 1961 |

OTHER REFERENCES

Litz: Opto-Electromechanical Digital Positions Comparator, IBM Tech. Disclosure Bulletin, June 1958.

Hatfield: Read Only Memory, IBM Tech. Disclosure Bulletin, October 1960.